Figure 5:
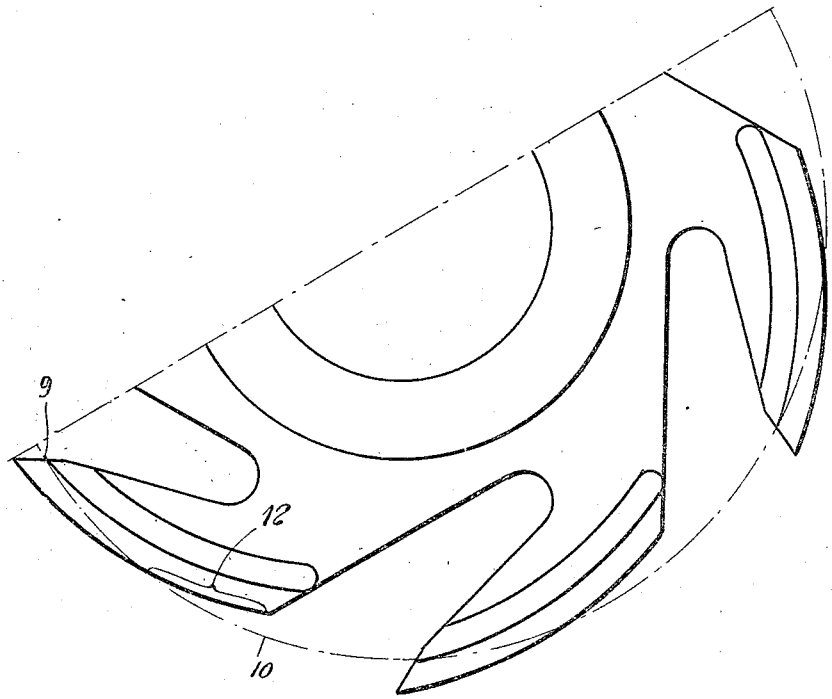
Figure 5A:
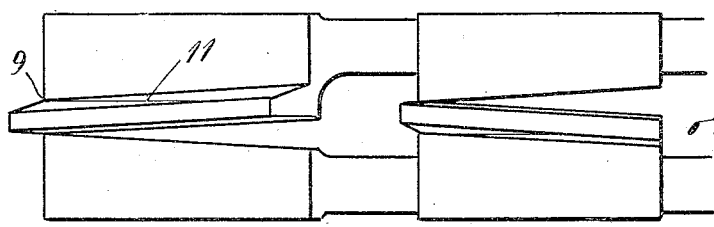

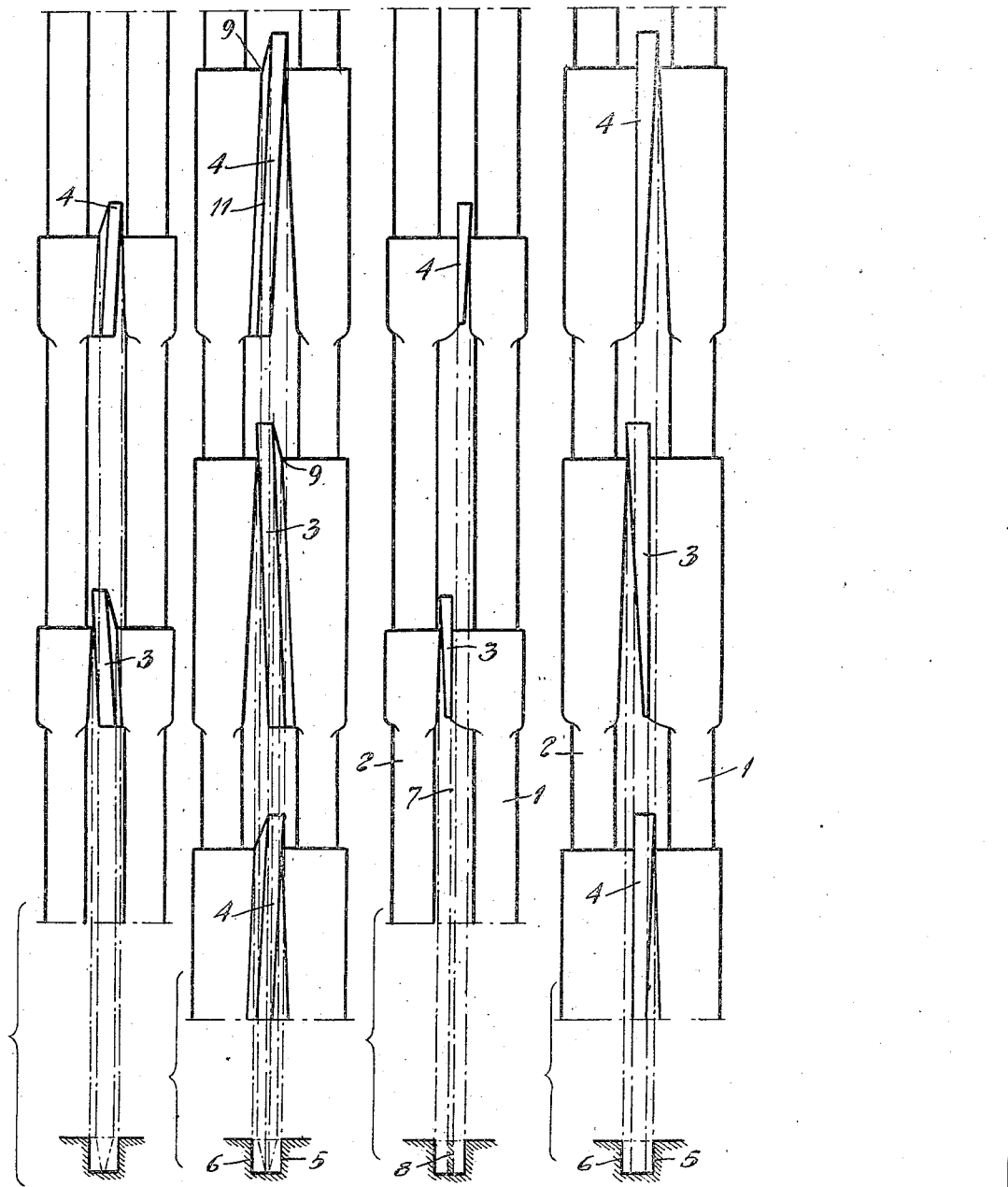

Aug. 12, 1930.  J. O. LIFFLANDER  1,772,905
CUTTER
Filed Dec. 19, 1928  2 Sheets-Sheet 2

Inventor
Johan Oscar Lifflander
by  Attorney

Patented Aug. 12, 1930

1,772,905

UNITED STATES PATENT OFFICE

JOHAN OSCAR LIFFLANDER, OF STOCKHOLM, SWEDEN, ASSIGNOR TO J. & C. G. BOLINDERS MEKANISKA VERKSTADS AKTIEBOLAG, A JOINT-STOCK COMPANY OF STOCKHOLM, SWEDEN

CUTTER

Application filed December 19, 1928, Serial No. 327,117, and in Sweden December 23, 1927.

The present invention refers to an arrangement in groove cutters comprising two axially adjacent parts (cutter halves) which are each per se provided with half the number of the teeth of the cutter, the teeth of the one cutter half-part being supported axially against the other half-part of the cutter in such manner that the teeth together with the adjacent supporting parts may be repeatedly ground and adjusted onto each other, without the position of the teeth adapted to a certain working profile being altered thereby.

That side of each tooth which at the point of the tooth forms the cutting edge with which the one wall of the groove is cut bears at the front, at said cutting edge, against the one-half part of the cutter and extends from said support obliquely rearwards with respect to the opposite side of the tooth, in order that the requisite taper for the cutting operation shall be obtained, counted from said cutting edge or supporting point respectively.

As already stated, a tooth arranged in this manner and its corresponding supporting part may be ground repeatedly, the half-part of the cutter being adjusted in accordance with the cutting operation, without the tooth position intended for a certain profile of groove being altered. By reason of the said rearward taper of the tooth, such grinding and adjustment will be limited, however, to a certain length of the tooth, counted from the point and rearwards, inasmuch as the adjustment will, after the grinding has passed a certain point along the said length, become so great that two consecutive teeth will be displaced past one another by such an amount as to cause a space between them in the axial direction, where the teeth cannot cut, but leave a ridge-shaped portion projecting from the bottom of the groove. Moreover, the strength of the teeth is reduced after they have been ground beyond a certain point, inasmuch as their thickness obviously decreases according as the grinding proceeds.

The present invention has for its object to obviate the said disadvantages, and through the invention an arrangement is provided whereby the cutter teeth and their respective supporting parts may be ground as far as onto the rear end of each tooth, without two consecutive teeth of the cutter being axially displaced past one another by the adjustment of the cutter halves. The grinding may also be effected up to any point without impairing the strength of the teeth.

The arrangement forming the object of the invention is principally distinguished by the feature that the teeth are not tapering but of uniform thickness along the whole of their length, that is to say from the supporting point of the teeth onto the adjacent cutter half-part and rearwards, so that no matter where a tooth bears along its length on the adjacent cutter half-part the tooth will always obtain such a position in relation to the preceding or the following tooth that a space is avoided between the teeth in the axial direction.

The invention is illustrated in the accompanying drawings in which, Figs. 1 and 2 show the arrangement of the cutters as used prior to the present invention, the drawing representing portions of the circumference of the cutters developed in a plane.

Figs. 3 and 4 in the same manner illustrate the novel arrangement.

Fig. 5 shows a portion of a cutter arranged according to the invention, the same being viewed in the longitudinal direction of the axis.

Fig. 5ª illustrates a partial view of Fig. 5 at right angles to the axis thereof.

Figure 6:
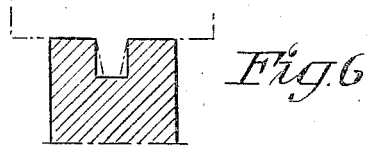

Fig. 6 shows a cross-section of a groove cut with the cutter.

According to Figs. 1 and 2, 1 and 2 designate the cutter halves situated adjacent to each other in the axial direction, each cutter half-part carrying half the number of cutter teeth. Thus, the cutter half-part 1 is provided with the teeth 3, and the cutter half-part 2 with the teeth 4. The side of each tooth 4 corresponding to the one wall 5 of the groove (see the cross-section in Fig. 1) extends obliquely rearwards with respect to the side of the tooth corresponding to the other wall 6 of the groove. This is also the case with the tooth 3, in that the side of the same corresponding to the wall 6 of the groove extends obliquely rearwards in relation to the side of the tooth corresponding to the wall 5 of the groove, and as already stated, this arrangement has for its object to provide the necessary taper at the tooth.

If the teeth thus devised are ground from time to time, and the grinding has ultimately proceeded as far as shown in Fig. 2, the teeth 3 and 4 will on mutual adjustment of the cutter halves be displaced past one another in the axial direction so much as to cause a space 7 between the teeth which leaves a ridge-like portion 8 projecting from the bottom of the groove (Fig. 2).

According to the arrangement considered by the invention and illustrated in Figs. 3 and 4, the teeth 3, 4 are not tapering rearwardly, the same showing a uniform thickness along the whole of their length. However, that side of each tooth which in the operation of the cutter moves along the one wall of the cut groove is of course extended obliquely in relation to the plane of rotation of the cutter, as required to provide for the spacing. On the other hand, the opposite side of the tooth does not extend in parallel to the plane of rotation, but is instead parallel to the first mentioned side of the tooth, so that the tooth will be of uniform thickness along the whole of its length.

Even if the teeth so devised are ground up to any point along the length of the tooth and the cutter halves are adjusted in a corresponding degree, the teeth being ground, for instance, to the half of their length as shown in Fig. 4, still the consecutive teeth can never, which will also appear from the last-mentioned figure in the drawing, be displaced so as to cause a space between them, and thus the teeth will always together cut off every portion of the groove.

However, the arrangement of the teeth in the manner above described necessitates a thinner formation of the teeth in the cut proper, that is to say at the outer edge, than is the case in the earlier arrangement where the teeth are made in accordance with Figs. 1 and 2, as otherwise there would not be left room enough for the teeth in the cut or the groove. However, if the teeth were made thinner in the manner described without taking special precautions, the strength of the teeth would be correspondingly reduced. This is avoided according to the present invention by the teeth having, when viewed in radial cross section, an increased width inwardly, that is to say toward the base, on the side opposite to that of the tapered spacing. Thus the side of the tooth opposite to that of the tapered spacing is oblique in relation to the walls of the cut groove, as will be seen from the drawing. By the enlargement toward the base thus produced the tooth obviously attains the requisite strength.

The said base enlargement may be present without hampering the free movement of the tooth in the cut slot or groove, the arcuate shape of the tooth, counted from the point and rearwardly, extending eccentrically with respect to the center point of the cutter, as will be seen from Fig. 5. At the front, at the point of the tooth, the base point 9 (see Figs. 5, 5$^a$ and 3) of the oblique side of the tooth is situated inside the wall 6 in the groove (see Fig. 3). If according to Fig. 5 the point 9 moves during rotation along the arc 10, and if according to Fig. 5$^a$ this arc intersects the outer tooth profile in the point 11, and if the latter point is also situated inside the wall 6 of the cut groove, then it is obvious that the portion 12 (Fig. 5) of the tooth situated behind the point 11 does not enter the groove and, consequently, has no opportunity to engage or abut the walls thereof.

What I claim is:—

1. A cutter comprising cutter halves having teeth, groove cutting teeth alternately positioned on each cutter half, integral with the alternate teeth thereof and bearing in an axial direction on the adjacent teeth of the other cutter half, said groove cutting teeth being of uniform thickness along the length thereof, accurate in profile, slightly inclined to the plane normal to the axis of the cutter and adapted to cut the wall of the groove opposite the cutter half upon which said groove cutting teeth are positioned.

2. A cutter according to claim 1 having said groove cutting teeth of increasing thickness approaching the axis of the cutter being tapered only on the side of said teeth adjacent the integral cutter half.

In testimony whereof I affix my signature.

JOHAN OSCAR LIFFLANDER.